United States Patent
Hiraoka (10) Patent No.: US 8,340,736 B2
(45) Date of Patent: Dec. 25, 2012

(54) MOBILE ELECTRONIC DEVICE

(75) Inventor: Yoshiaki Hiraoka, Yokohama (JP)

(73) Assignee: Kyocera Corporation, Kyoto (JP)

( * ) Notice: Subject to any disclaimer, the term of this patent is extended or adjusted under 35 U.S.C. 154(b) by 117 days.

(21) Appl. No.: 12/748,342

(22) Filed: Mar. 26, 2010

(65) Prior Publication Data
US 2010/0248800 A1 Sep. 30, 2010

(30) Foreign Application Priority Data

Mar. 26, 2009 (JP) ................................. 2009-075458
Feb. 25, 2010 (JP) ................................. 2010-039526

(51) Int. Cl.
*H04M 1/00* (2006.01)
(52) U.S. Cl. ................ 455/575.7; 455/575.1; 455/575.3
(58) Field of Classification Search ................ 455/90.3, 455/575.1, 575.3, 575.5, 575.7; 343/301, 343/702, 841
See application file for complete search history.

(56) References Cited

U.S. PATENT DOCUMENTS

| | | | | |
|---|---|---|---|---|
| 6,295,462 | B1 * | 9/2001 | Kudoh | 455/41.3 |
| 6,909,401 | B2 * | 6/2005 | Rutfors et al. | 343/702 |
| 2002/0169010 | A1 | 11/2002 | Shoji et al. | |
| 2010/0215111 | A1 * | 8/2010 | Filipovic et al. | 375/267 |

FOREIGN PATENT DOCUMENTS

| | | |
|---|---|---|
| JP | 2002-335180 | 11/2002 |
| JP | 2005-167912 | 6/2005 |

* cited by examiner

*Primary Examiner* — Tuan H Nguyen
(74) *Attorney, Agent, or Firm* — Richard C. Kim; Duane Morris, LLP (57) ABSTRACT

A system and method for controlling antennas in a mobile electronic device is disclosed. The mobile electronic device comprises a first case comprising first antenna means and second case comprising second antenna means. The mobile electronic device is operable to communicate using the first antenna means when in a closed state and using the first and second antenna means when in an opened state.

15 Claims, 8 Drawing Sheets

MOBILE ELECTRONIC DEVICE

CROSS-REFERENCE TO RELATED APPLICATION

The present application claims priority under 35 U.S.C. §119 to Japanese Application No. 2009-075458, filed on Mar. 26, 2009, entitled "MOBILE ELECTRONIC DEVICE", and Japanese Application No. 2010-039526, filed on Feb. 25, 2010, entitled "MOBILE ELECTRONIC DEVICE". The contents of which are incorporated by reference herein in their entirety.

FIELD

Embodiments of the present invention relate generally to mobile electronic devices, and more particularly relate to a mobile electronic device comprising an antenna capable of communication with other devices.

BACKGROUND

A foldable mobile electronic device may comprise first and second cases that are able to shift, via a hinge, between an open position and a closed position. The foldable mobile electronic device may also communicate with external devices via an antenna. A first conductive unit may be arranged in the first case, and a second conductive unit may be arranged in the second case, and both may be used as radiating elements of the antenna. Use of the first and second conductive units can enhance communication quality in the open position; however, in the closed position the first and second conductive units may interfere with each other. For example, a high frequency current in the first case and a high frequency current in the second case may flow in opposite directions that cancel each other's signal and deteriorate antenna gain.

Therefore, there is a need for systems, methods, and mobile electronic devices that provide improved antenna gain when in a closed position.

SUMMARY

A system and method for controlling antennas in a mobile electronic device is disclosed. The mobile electronic device comprises a first case comprising a first antenna and second case comprising a second antenna. The mobile electronic device is operable to communicate using the first antenna when in a closed state and using the first and second antenna when in an opened state.

A first embodiment comprises a mobile electronic device. The mobile electronic device comprises a first case coupled to a second case. The first and second cases are operable to provide one of a closed state and an opened state. The mobile electronic device further comprises a detection module operable to detect the opened state and the closed state, and a selection switch operable to provide one of a first connection state and a second connection state. The second connection state comprises a balanced feed antenna electrically coupled to a feeding unit. The mobile electronic device also comprises a control module operable to select the first connection state, if the opened state is detected by the detection module, and select the second connection state, if the closed state is detected by the detection module.

A second embodiment comprises a mobile electronic device. The mobile electronic device comprises a pair of cases operable to be in one of an opened state and a closed state, a first antenna, and a second antenna. The mobile electronic device also comprises a control module operable to conduct communication by using the first antenna when the cases are in a closed state, and by using the first antenna and the second antenna when the cases are in an opened state.

A third embodiment comprises a method of operating a mobile electronic device. The method provides a pair of cases operable to be in an opened state and a closed state, first antenna means, and second antenna means. The method further communicates by using the first antenna means when the cases are in the closed state, and by using the first antenna means and the second antenna means when the cases are in the opened state.

BRIEF DESCRIPTION OF THE DRAWINGS

Embodiments of the present invention are hereinafter described in conjunction with the following figures, wherein like numerals denote like elements. The figures are provided for illustration and depict exemplary embodiments of the present invention. The figures are provided to facilitate understanding of the present invention without limiting the breadth, scope, scale, or applicability of the present invention. The drawings are not necessarily made to scale.

DETAILED DESCRIPTION

The following description is presented to enable a person of ordinary skill in the art to make and use the embodiments of the present invention. The following detailed description is exemplary in nature and is not intended to limit the present invention or the application and uses of the embodiments of the present invention. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the present invention are described herein in the context of one practical non-limiting application, namely, a mobile phone. Embodiments of the present invention, however, are not limited to such mobile phones, and the techniques described herein may also be utilized in other applications. For example, embodiments may be applicable to digital cameras, electronic game machines, digital music players, personal digital assistance (PDA), personal handy phone system (PHS), lap top computers, a mobile navigation device, a notebook-sized personal computer, and the like.

As would be apparent to one of ordinary skill in the art after reading this description, these are merely examples and the embodiments of the present invention are not limited to operating in accordance with these examples. Other embodiments may be utilized and structural changes may be made without departing from the scope of the exemplary embodiments of the present invention.

Figure 1:
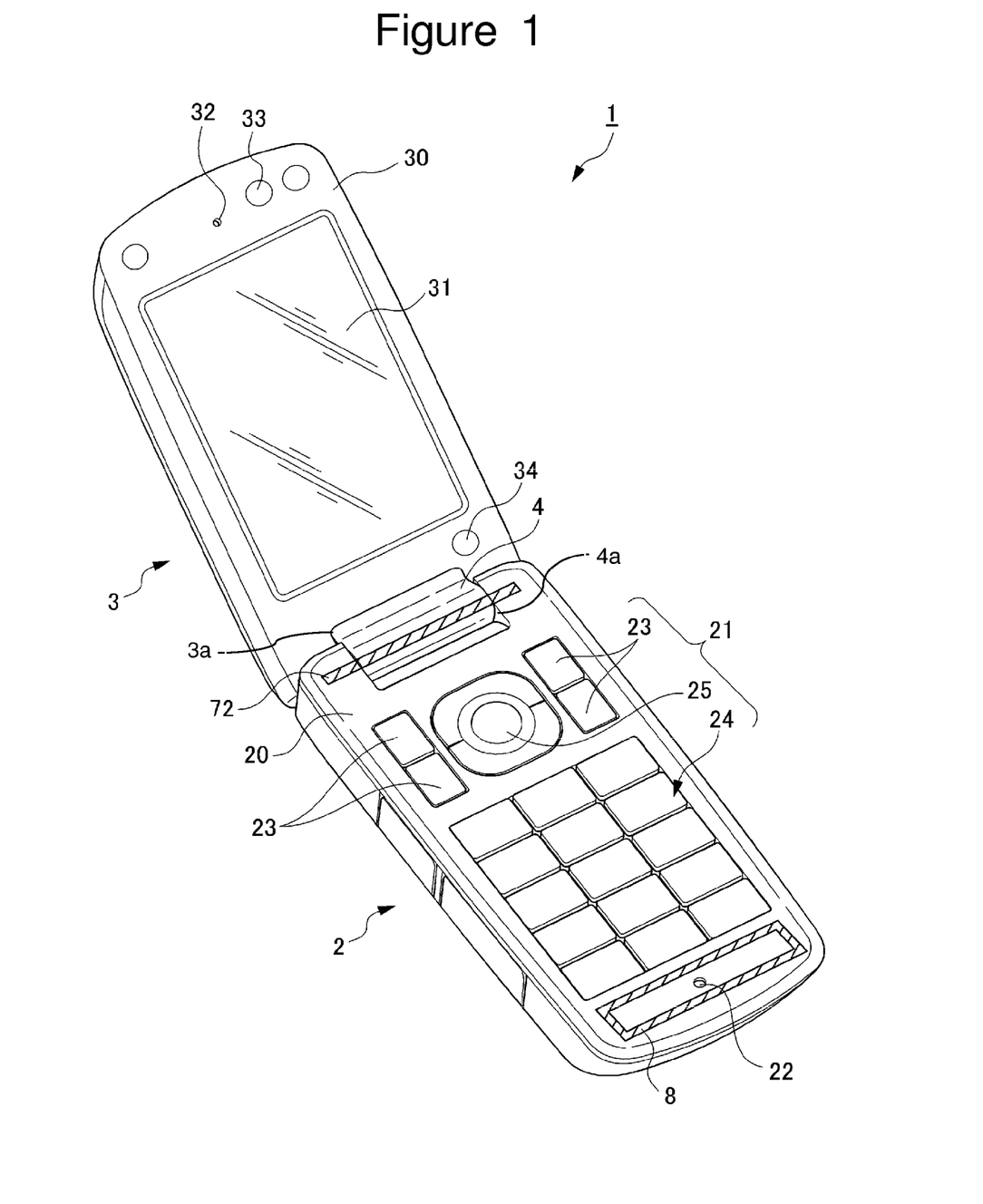
FIG. 1 is an illustration of a perspective view of a mobile electronic device according to an embodiment of the present invention.
Figure 2A:
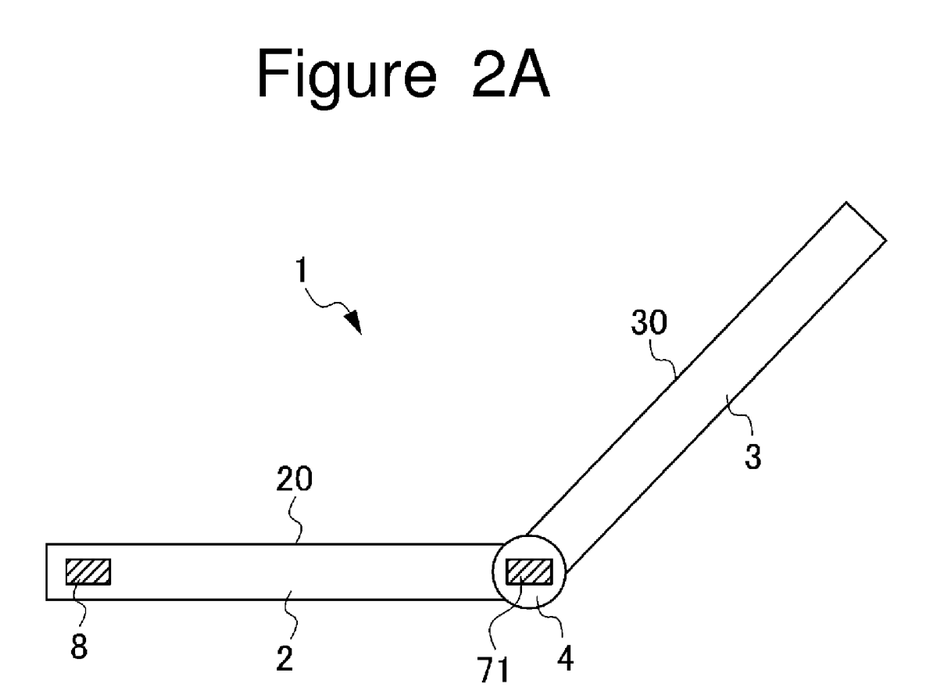
FIG. 2A is an illustration of an opened state of the mobile electronic device shown FIG. 1.
Figure 2B:
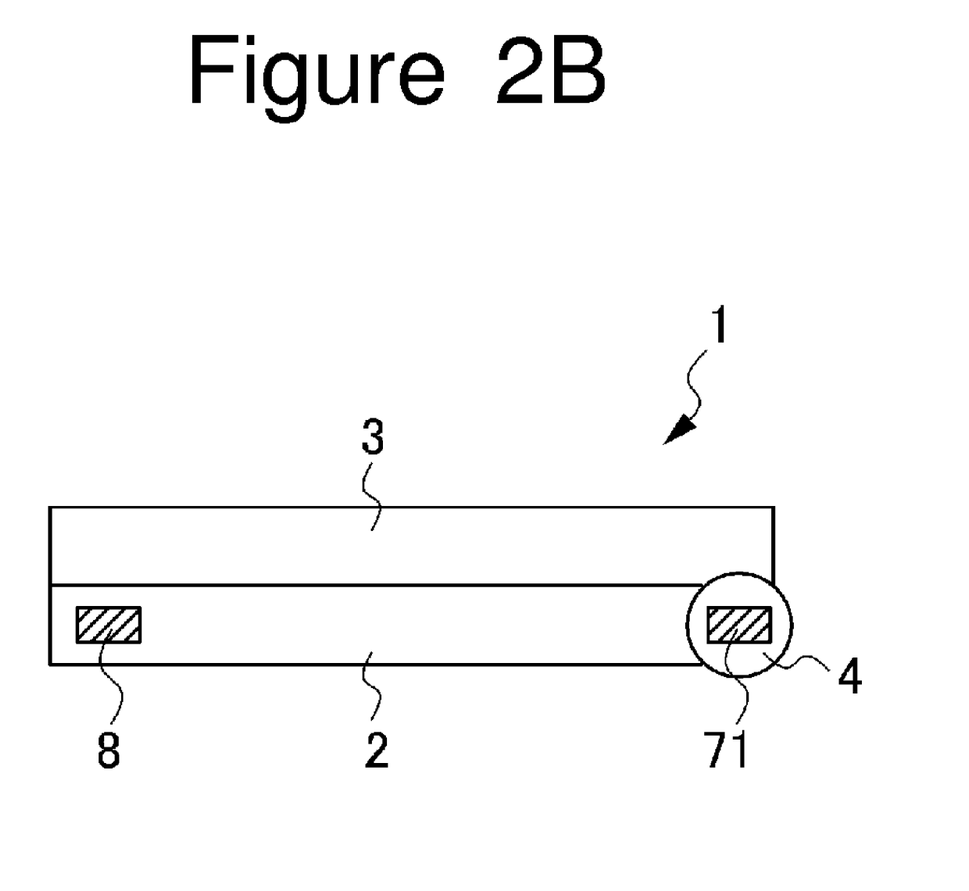
FIG. 2B is an illustration of a closed state of the mobile electronic device shown FIG. 1.

FIG. 1 is an illustration of a perspective view of a mobile electronic device 1 (mobile terminal 1). FIG. 2A is an illustration of an opened state of the mobile electronic device shown FIG. 1. FIG. 2B is an illustration of a closed state of the mobile electronic device shown FIG. 1.

The mobile terminal 1 may be, for example but without limitation, a foldable type as shown in FIGS. 1, 2A and 2B, a sliding type (FIGS. 6A-6B), or the like. For example, the mobile terminal 1 may be configured so that the surface of the first case 2 can be changed to be exposed from or covered with the second case 3. For another example, the mobile terminal 1 may be a turning type in which one case is turned around a center of an axial line along an overlapping direction of the first case 2 and the second case 3.

The mobile terminal 1 (mobile phone) comprises a first case 2 and a second case 3. The first case 2 comprises a first surface portion 20. The first surface portion 20 may be provided with an operation key group 21 and a microphone 22. The microphone 22 receives a voice spoken by a user of the mobile terminal 1 during a telephone conversation. The operation key group 21 comprises function setting operation buttons 23, input operation buttons 24, and a determination operation button 25. The function setting operation buttons 23 are made to operate various functions such as various settings, a phonebook function, an e-mail function, and the like. Numerals of a phone number, characters of an e-mail, and the like can be input by using the input operation buttons 24. Determination and scrolling in various operations are made by using the determination operation button 25.

The second case 3 comprises a second surface portion 30. The second surface portion 30 may be provided with a display 31, an audio output module 32, an imaging module 33, and a speaker 34. The display 31 can display various kinds of information. The audio output module 32 outputs voice data received from a second party during a telephone conversation. The imaging module 33 comprises a charge coupled device (CCD) such as a camera, and the like which images an object. The speaker 34 outputs music, and the like.

The mobile terminal 1 also comprises a hinge portion 4. The hinge portion 4 couples an upper portion 4a of the first case 2 to a lower portion 3a of the second case 3. The first case 2 and the second case 3 are operable to turn relative to each other by using the hinge portion 4 as a base point. Accordingly, the first case 2 and the second case 3 can be in an opened state or in a folded state (closed state) relative to each other.

Figure 3:
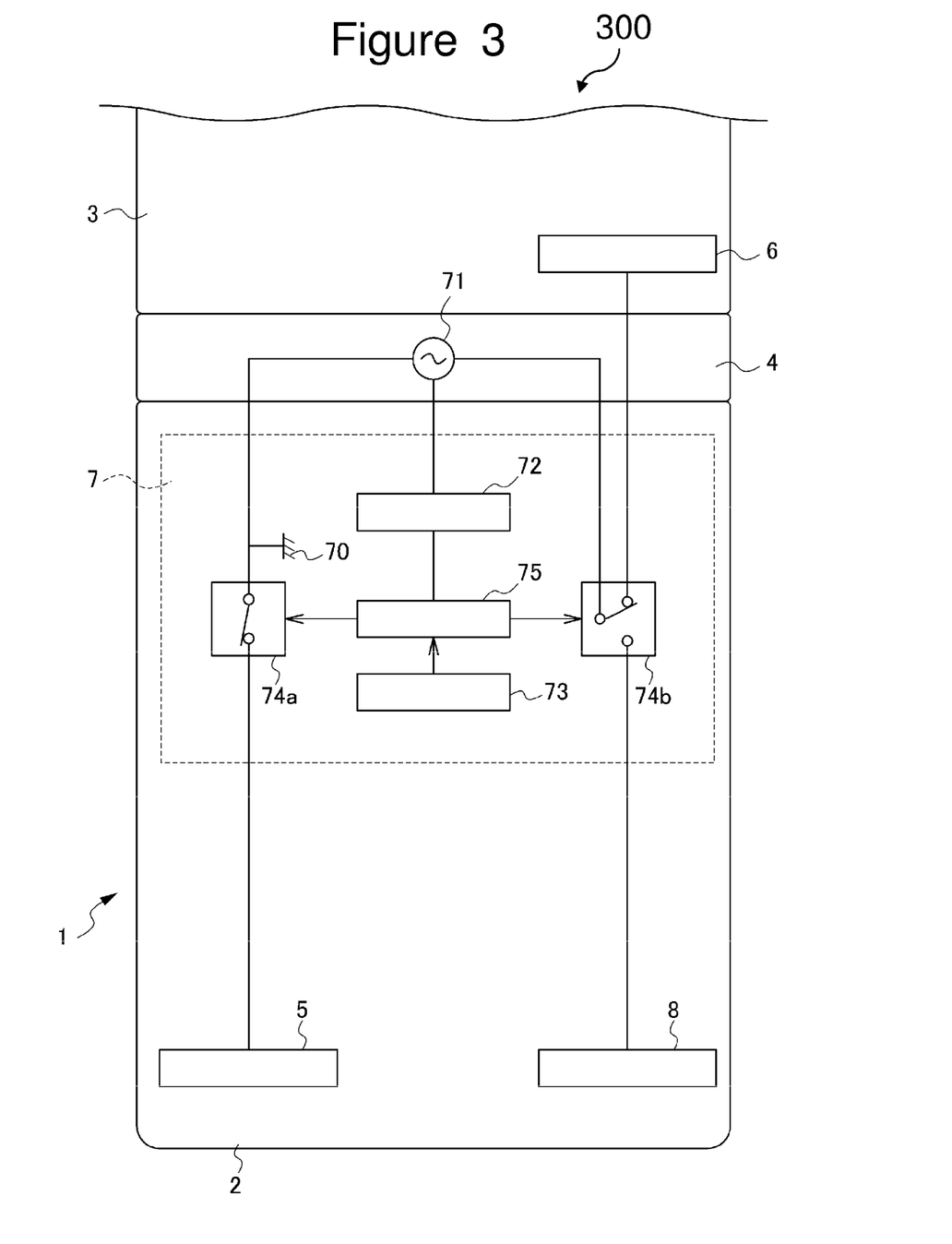
FIG. 3 is an illustration of an exemplary functional block diagram of a mobile electronic device according to an embodiment of the present invention.

FIG. 3 is an illustration of an exemplary functional block diagram of a mobile electronic device 300 according to an embodiment of the present invention. The mobile electronic device 300 comprises a first case 2, a second case 3, and a hinge portion 4a. The mobile electronic device 300 may have functions, material, and structures that are similar to the mobile terminal 1. Therefore common features, functions, and elements may not be redundantly described here.

The first case 2 may comprise a first conductive unit 5, a circuit unit 7, and a conductive member 8.

The first conductive unit 5 comprises a ground pattern and a shield case of a circuit board (not shown), and a conductive member which forms the first case 2.

The circuit unit 7 comprises a ground unit 70, a feeding unit 71, a radio circuit 72 serving as a signal processing module, a control module 75, an open and close detection module 73 serving as a detection module detecting the opened state and the closed state of the mobile terminal 1, a first selection switch 74a, and a second selection switch 74b.

The ground unit 70 may be coupled to the first conductive unit 5 via the first selection switch 74a.

The feeding unit 71 may be coupled to the second conductive unit 6 or the conductive member 8 via the second selection switch 74b to perform power feeding. The feeding unit 71 may be provided, for example but without limitation, near the hinge portion 4, on the hinge portion 4, arranged at an effective position in view of the antenna gain depending on a positional relationship with the radiating element of the antenna, and the like. For example, the feeding unit 71 may be located at a position closer to the conductive member 8 serving as the radiating element of a second antenna.

The control module 75 is coupled to the open and close detection module 73, the first selection switch 74a, the second selection switch 74b, and the radio circuit 72 and is operable to control the first selection switch 74a and the second selection switch 74b based on whether the open and close detection module 73 detects the opened state or the closed state of the mobile terminal 1. The control module 75 uses signal data generated by the radio circuit 72 for, for example but without limitation, phone call processing, e-mail processing, terrestrial digital broadcasting, and the like.

The conductive member 8 is coupled to the feeding unit 71 via the second selection switch 74b. In this manner, power can be fed from the feeding unit 71 to the conductive member 8. The conductive member 8, may be, for example but without limitation, formed in a looped shape by a coil member, or the like. When power feeding is made by the feeding unit 71, the conductive member 8 is used for a loop antenna. The conductive member 8 may be, for example but without limitation, arranged at an end portion of the first case 2, that is, at an end portion on an opposite side to the hinge portion 4 side where the feeding unit 71 is arranged in the first case 2, and the like. For example, the conductive member 8 serving as a balanced feed antenna may be arranged at an end portion of the first conductive unit 5, the end portion being arranged on the opposite side to the hinge portion 4 side where the first case 2 and the second case 3 are coupled. For another example, the conductive member 8 may be arranged on the second case 3. Further, the conductive member 8 may be arranged in a different case than the case where the feeding unit 71, the ground unit 70, and the radio circuit 72 are located.

The first selection switch 74a connects the first conductive unit 5 to the ground unit 70 and disconnects the first conductive unit 5 from the ground unit 70 by the designation from the control module 75 based on a detection result of the open and close detection module 73. The second selection switch 74b switches the connection of the second conductive unit 6 and the conductive member 8 by the designation from the control module 75 based on the detection result of the open and close detection module 73. The first selection switch 74a and the second selection switch 74b can connect the second conductive unit 6 to the feeding unit 71. In addition, the first selection switch 74a and the second selection switch 74b can select a first connection state where the first conductive unit 5 is connected to the ground unit 70. Also, the first selection switch 74a and the second selection switch 74b can select a second connection state where the conductive member 8 is connected to the feeding unit 71 and the first conductive unit 5 is disconnected from the ground unit 70.

As described above, when power is fed to the second conductive unit 6 by the feeding unit 71, the power-fed second conductive unit 6 and the first conductive unit 5 are electrically coupled. In this manner, a first antenna is provided comprising the first conductive unit 5 and the second conductive unit 6. The second conductive unit 6 serves as a radiating element of a first antenna, and the first conductive unit 5 serves as a first ground of the first antenna. The first antenna is a dipole antenna (unbalanced feed antenna).

In the above description, the feeding unit 71, the ground unit 70, and the radio circuit 72 are arranged in the first case 2; however, these elements may be arranged in the second case 3.

The second case 3 comprises a second conductive unit 6. The second conductive unit 6 comprises, for example, a ground pattern and a shield case of a circuit board (not shown), and a conductive member and the like which forms the second case 3.

Figure 4:
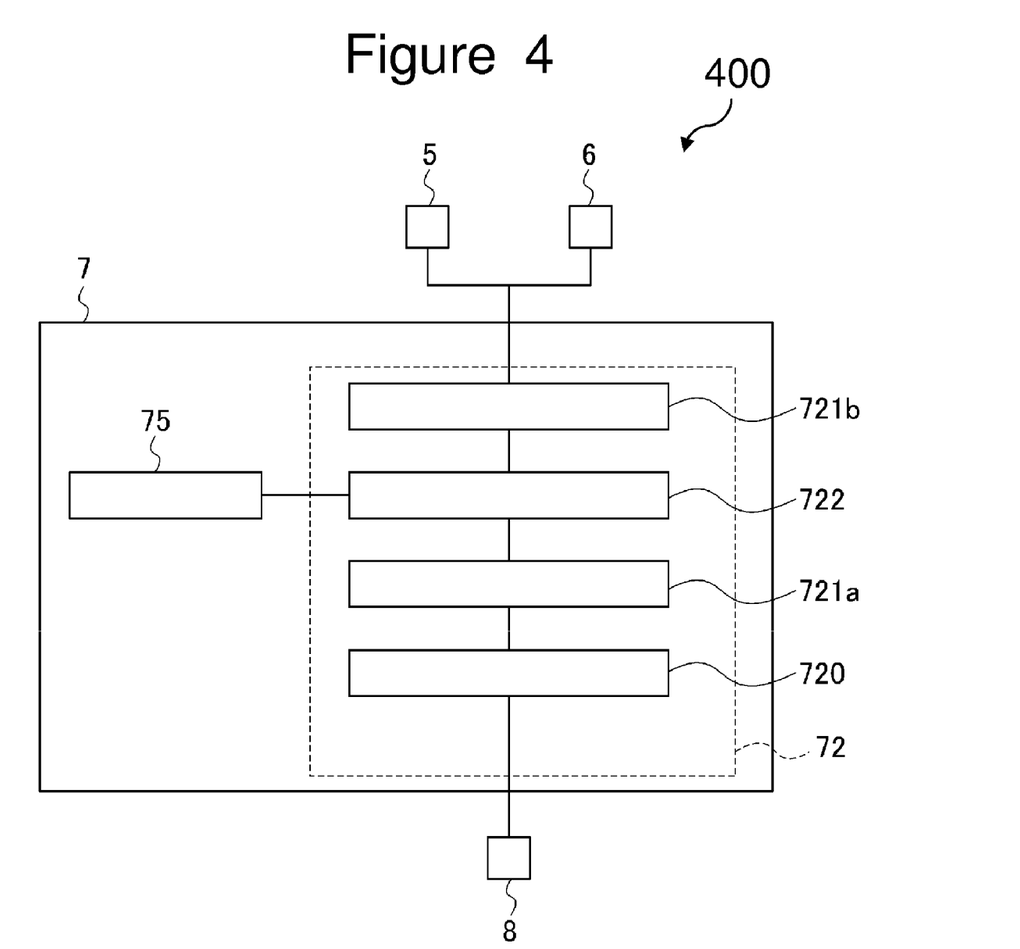
FIG. 4 is an illustration of an exemplary functional block diagram of a mobile electronic device according to an embodiment of the present invention.

FIG. 4 is an illustration of an exemplary functional block diagram of a mobile electronic device 400 according to an embodiment of the present invention. The mobile electronic device 400 comprises a radio circuit 72, a first conductive unit 5, a second conductive unit 6, a conductive member 8, a radio circuit 72, and a control module 75. The mobile electronic device 400 may have functions, material, and structures that are similar to the module 300. Therefore common features, functions, and elements may not be redundantly described here.

The radio circuit 72 processes a signal received from an antenna formed by one or more of the first conductive unit 5, the second conductive unit 6, and the conductive member 8. The radio circuit 72 comprises a balance/imbalance conversion circuit 720, a first adjustment module 721a, a second adjustment module 721b, and a radio frequency (RF) circuit 722. The balance/imbalance conversion circuit 720 converts a balance signal to an imbalance signal when the balance/imbalance conversion circuit 720 receives the balance signal. The balance signal is received by the second antenna as explained in more detail below. The first adjustment module 721a adjusts impedance of a signal received from the conductive member 8. The second adjustment module 721b adjusts impedance of a signal received from the second conductive unit 6.

The impedance of the signal received from the radiating element side of the first antenna (second case 3 side) is adjusted by the adjustment module 721 of the radio circuit 72. Next, the signal is converted to suitable data for use by the RF circuit 722. The converted signal can then be used by the control module 75 for, for example but without limitation, phone call processing, e-mail processing, terrestrial digital broadcasting, and the like.

If power is fed to the conductive member 8 by the feeding unit 71, the conductive member 8 serves as a radiating element of the second antenna, thereby providing the second antenna. The second antenna constitutes the loop antenna (balanced feed antenna).

As for the signal received from the radiating element side of the second antenna (first case 2 side), the balance signal is converted to the imbalance signal by the balance/imbalance conversion circuit module 720 of the radio circuit 72. Secondly, an impedance of the signal is adjusted by the adjustment module 721. Next, the signal is converted to be suitable data for use by the RF circuit 722. The converted signal can then be used by the control module 75 for, for example but without limitation, phone call processing, e-mail processing, terrestrial digital broadcasting, and the like.

According to one embodiment, the mobile terminal 1 comprises two antennas and operates as follows according to opened and closed states of the mobile terminal 1.

When the mobile terminal 1 is in the opened state, communication is made via the first antenna. The open and close detection module 73 detects the opened state; and the first selection switch 74a and the second selection switch 74b are switched to the first connection state by the control module 75. When the selection switch 74a/74b is switched to the first connection state, the feeding unit 71 is connected to the second conductive unit 6 and the ground unit 70 is connected to the first conductive unit 5. Then, the second conductive unit 6 is power-fed by the feeding unit 71 and the first conductive unit 5 coupled to the ground unit 70 are electrically connected. In this manner, a signal may be received by the first antenna.

When the mobile terminal 1 is in the closed state, strength of the signals received from the first antenna and the second antenna are compared; and communication is conducted via an antenna with higher received signal strength as explained in more detail below.

If the detection module 73 detects the closed state, the control module 75 switches the first selection switch 74a and the second selection switch 74b to the first connection state. In this manner, the feeding unit 71 is connected to the second conductive unit 6, and the ground unit 70 is connected to the first conductive unit 5. Then, the second conductive unit 6 is power-fed by the feeding unit 71 and the first conductive unit 5 connected to the ground unit 70 are electrically connected; and the first antenna receives a signal.

The control module 75 switches the first selection switch 74a and the second selection switch 74b to the second connection state; accordingly, the feeding unit 71 is connected to the conductive member 8 and the first conductive unit 5 is disconnected from the ground unit 70. Then, the feeding unit 71 and the conductive member 8 are electrically connected; and the second antenna receives a signal.

The signals received by the first antenna and the second antenna are processed by the radio circuit 72, and strength of the received signals are compared by the control module 75.

If the strength of the signal received by the second antenna is higher than the strength of the signal received by the first antenna, the control module 75 switches the first selection switch 74a and the second selection switch 74b to the second connection state. Accordingly, the feeding unit 71 is connected to the conductive member 8 and the first conductive unit 5 is disconnected from the ground unit 70. Then, the feeding unit 71 and the conductive member 8 are electrically coupled, and the second antenna receives a signal.

If, the strength of the signal received by the first antenna is higher than the strength of the signal received by the second antenna, the control module 75 switches the first selection switch 74a and the second selection switch 74b to the first connection state. Then, the second conductive unit 6 power-fed by the feeding unit 71 and the first conductive unit 5 connected to the ground unit 70 are electrically connected, and the first antenna receives a signal.

The mobile terminal 1 according to one embodiment can operate as follows.

When the mobile terminal 1 is in the opened state, communication is made by the first antenna. The opened state is detected by the open and close detection module 73; and the first selection switch 74a and the second selection switch 74b are switched to the first connection state by the control module 75. When the first selection switch 74a and the second selection switch 74b are switched to the first connection state, the feeding unit 71 is connected to the second conductive unit 6 and the ground unit 70 is connected to the first conductive unit 5. Then, the second conductive unit 6 power-fed by the feeding unit 71 and the first conductive unit 5 connected to the ground unit 70 are electrically connected. In this manner, a signal can be received by the first antenna.

When the mobile terminal 1 is in the closed state, communication is made by the second antenna. The open and close detection module 73 detects the closed state; and the first selection switch 74a and the second selection switch 74b are switched to the second connection state by the control module 75. When the first selection switch 74a and the second selection switch 74b are switched to the second connection state, the feeding unit 71 and the conductive member 8 are electrically connected; the first conductive unit 5 is disconnected from the ground unit 70. In this manner, signals can be received by the second antenna.

Furthermore, the mobile terminal 1 may be configured such that when the mobile terminal 1 is in the opened state, strength of the signals received by the first antenna and the second antenna are compared and communication is made by an antenna with higher signal strength.

If the open and close detection module 73 detects the opened state, the control module 75 switches the first selection switch 74a and the second selection switch 74b to the first connection state. In this configuration, the feeding unit 71 is connected to the second conductive unit 6, the ground unit 70 is connected to the first conductive unit 5, and the first antenna receives a signal.

Next, the control module 75 switches the first selection switch 74a and the second selection switch 74b to the second connection state, accordingly, the feeding unit 71 is connected to the conductive member 8, the first conductive unit 5 is disconnected from the ground unit 70, and the second antenna can receive a signal.

The signals received by the first antenna and the second antenna are processed by the radio circuit 72, and strength of the received signals are compared by the control module 75.

If the strength of the signal received by the first antenna is higher than the signal received by the second antenna, the control module 75 controls the first selection switch 74a and the second selection switch 74b to the first connection state, and the first antenna receives a signal.

However, if the strength of the signal received by the second antenna is higher than the strength of the signal received by the first antenna, the control module 75 controls the first selection switch 74a and the second selection switch 74b to the second connection state, and the second antenna receives a signal.

As described above, when the open and close detection module 73 detects the opened state by the control of the control module 75, the selection switch 74 selects the first connection state, and when the open and close detection module 73 detects the closed state, the selection switch 74 selects the second connection state.

In the closed state, the first antenna is not used, but the second antenna is used; and accordingly, it becomes difficult to flow a high frequency current through the first case 2. In this manner, it becomes possible to easily balance the high frequency currents each flowing through the first case 2 and the second case 3; and therefore, a good antenna gain can be maintained in the closed state.

In the opened state, the signal strength to be processed by the radio circuit 72 in the first connection state is compared with the signal strength to be processed by the radio circuit 72 in the second connection state, and accordingly, the selection switch 74 is controlled.

The mobile terminal 1 selects the antenna to be used based on strongest signal. That is, two antennas are selectively used by what is called a diversity system. For example, if an antenna with higher received signal strength is used, a preferable communication environment can be maintained. Therefore, of the first antenna and the second antenna, the antenna with higher received signal strength is selected.

Figure 5:
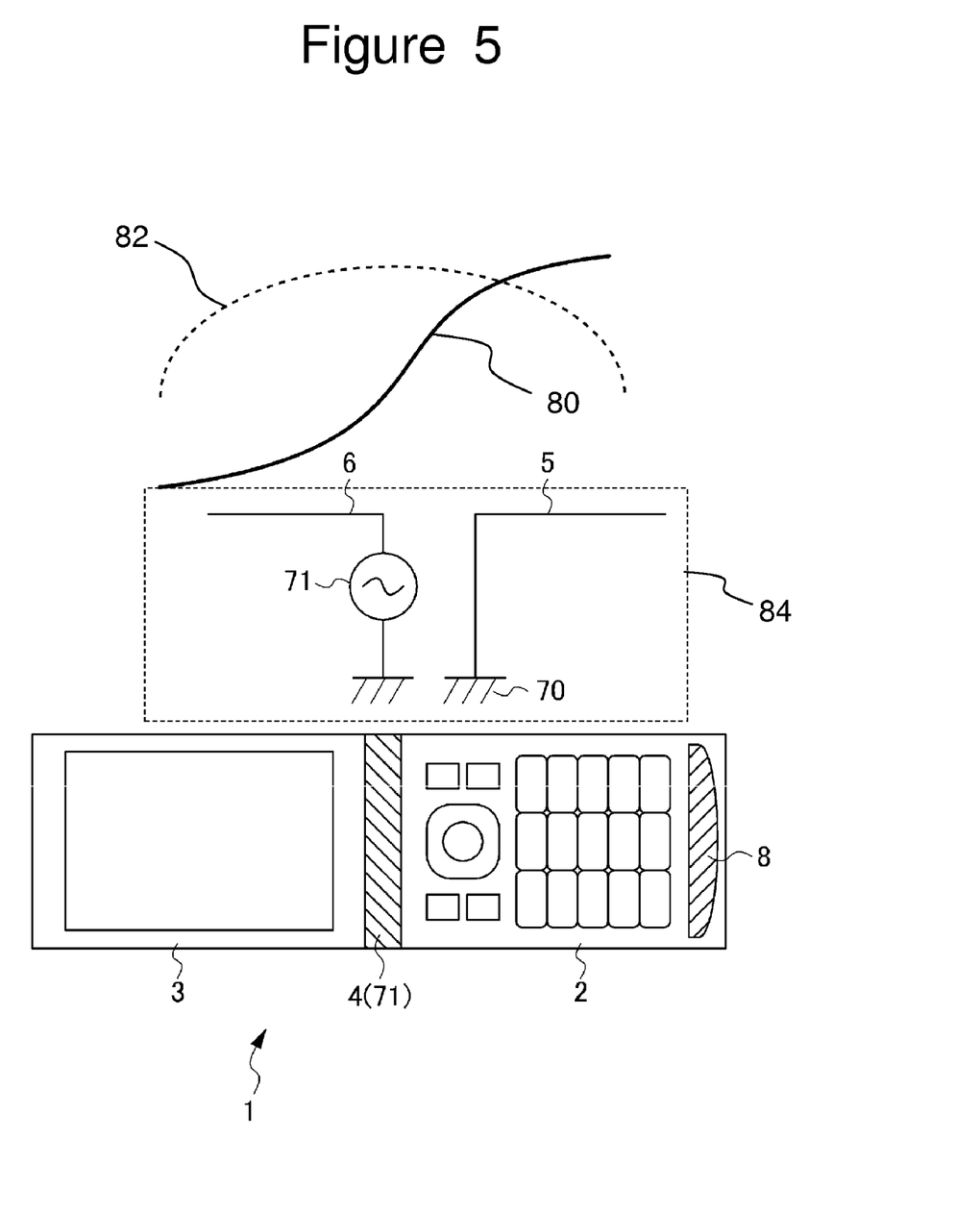
FIG. 5 is an illustration of exemplary impedance characteristics of an unbalanced feed antenna.

FIG. 5 is an illustration of exemplary impedance characteristics of an unbalanced feed antenna. A curve 80 shows a distribution of a voltage corresponding to a longitudinal position of the mobile telephone 1 in the drawing. A curve 82 shows a distribution of a current corresponding to a longitudinal position of the mobile telephone 1 shown in FIG. 5. Furthermore, an electric circuit 84 is an image of an electric circuit in the longitudinal position of the mobile telephone 1. If the first antenna is used, the second conductive unit 6 and the first conductive unit 5 are electrically coupled to receive a signal. That is, in order to serve as a dipole antenna, impedance characteristics of the antenna have impedance characteristics of an unbalanced feed antenna.

In the unbalanced feed antenna, impedance at an open end of an element (the radiating element of the first antenna or the ground of the first antenna) of the first antenna becomes a high state with respect to the impedance of the feeding unit 71, and accordingly, a standing-wave is formed to maintain a good antenna gain. However, impedance at the radiating element of the first antenna or at the end of the first ground becomes a low state with respect to the impedance of the feeding unit 71, the antenna gain lowers.

In view of such the characteristics of the unbalanced feed antenna, in the mobile terminal 1, the conductive member 8 serving as the radiating element of the balanced feed antenna is arranged at the end portion of the first conductive unit 5 serving as the ground of the antenna. With such a configuration, the radiating element of the balanced feed antenna with higher impedance characteristics as compared with the unbalanced feed antenna is arranged at the open end of the first antenna element, and therefore, the open end of the ground of the first antenna can be kept at a high impedance state. Consequently, in the opened state, the antenna gain in the case of using the first antenna can be improved.

Communication by the unbalanced feed antenna and the balanced feed antenna may be, for example but without limitation, selectively performed based on the antenna gain using antenna diversity, and the like. A communication method may be employed, if signals are effectively received by two antennas, for example, the communication may be performed by combining signals received by the unbalanced feed antenna and the balanced feed antenna and adjusting the signals.

In the above description, the second antenna serving as the balanced feed antenna is the loop antenna in which the conductive member 8 is formed in a looped shape, however, the second antenna may be, for example but without limitation, a folded dipole antenna, and the like.

Figure 6A:
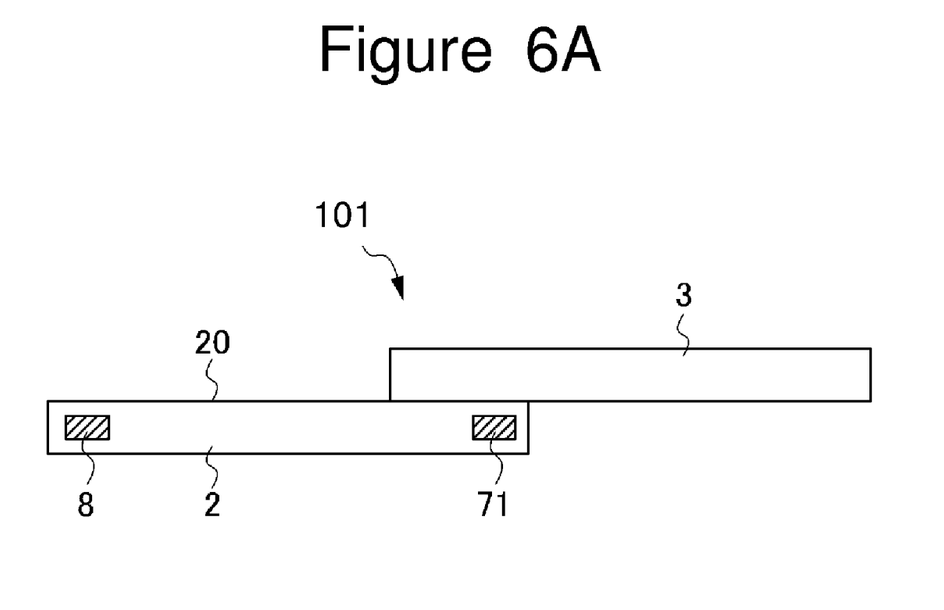
FIG. 6A is an illustration of an opened state of a mobile electronic device according to an embodiment of the present invention.
Figure 6B:
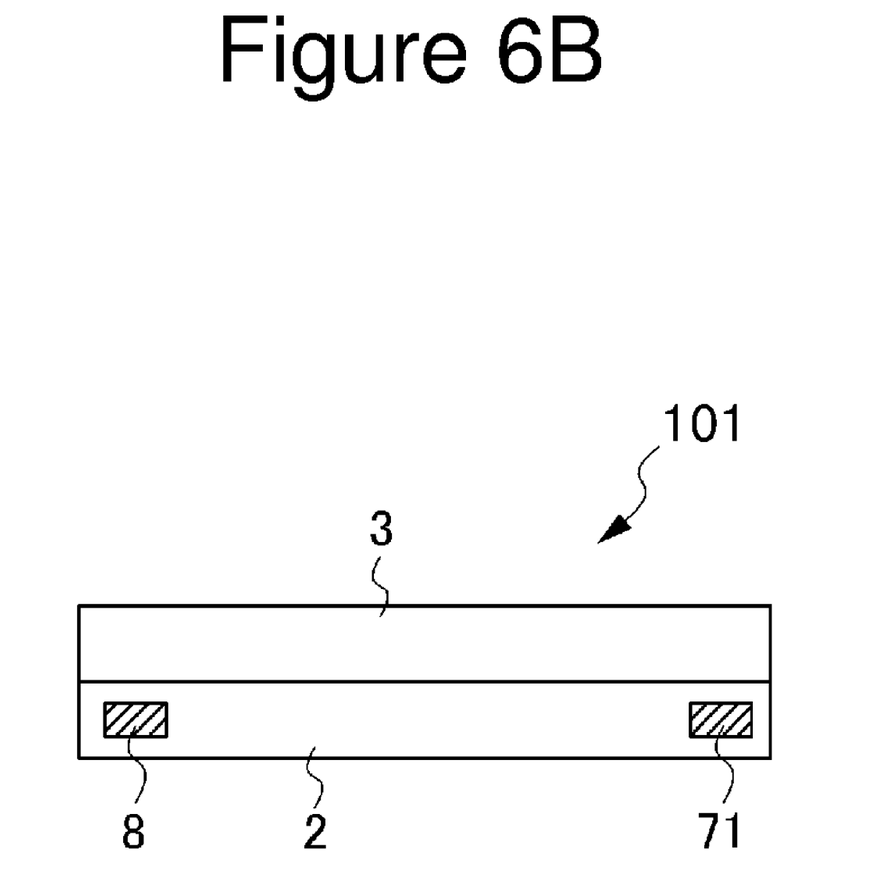
FIG. 6B is an illustration of a closed state of a mobile electronic device according to an embodiment of the present invention.

FIGS. 6A and 6B are illustrations of an opened state and a closed state of a sliding type mobile electronic device 101 according to an embodiment of the present invention respectively.

The sliding type mobile electronic device 101 may have functions, material, and structures that are similar to the embodiments shown in FIGS. 1-5. Therefore common features, functions, and elements may not be redundantly described here. The sliding type mobile electronic device 101 is operable to transit from a state where a first surface portion 20 of a first case 2 is exposed (FIG. 6A) to a closed state where the first surface portion 20 of the first case 2 is covered with a second case 3 (FIG. 6B), or vice versa.

The first case 2 comprises a feeding unit 71, a conductive member 8, a first antenna and a second antenna (not shown, see FIGS. 1 to 5). Then, the first antenna is used in the closed state, and one of the first antenna and the second antenna with higher received signal strength is used in the opened state.

While at least one exemplary embodiment has been presented in the foregoing detailed description, the present invention is not limited to the above-described embodiment or embodiments. Variations may be apparent to those skilled in the art. In carrying out the present invention, various modifications, combinations, sub-combinations and alterations may occur in regard to the elements of the above-described embodiment insofar as they are within the technical scope of the present invention or the equivalents thereof. The exemplary embodiment or exemplary embodiments are examples, and are not intended to limit the scope, applicability, or configuration of the invention in any way. Rather, the foregoing detailed description will provide those skilled in the art with a template for implementing the exemplary embodiment or exemplary embodiments. It should be understood that various changes can be made in the function and arrangement of elements without departing from the scope of the invention as set forth in the appended claims and the legal equivalents thereof. Furthermore, although embodiments of the present invention have been described with reference to the accompanying drawings, it is to be noted that changes and modifications may be apparent to those skilled in the art. Such changes and modifications are to be understood as being comprised within the scope of the present invention as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present invention may be described or claimed in the singular, the plural is contemplated to be within the scope thereof unless limitation to the singular is explicitly stated. The presence of broadening words and phrases such as "one or more", "at least", "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile electronic device comprising:
a first case coupled to a second case, wherein the first case and the second case are operable to provide one of a closed state and an opened state;
a detection module operable to detect the opened state and the closed state;
a selection switch operable to provide one of a first connection state and a second connection state, the second connection state comprising a balanced feed antenna electrically coupled to a feeding unit; and
a control module operable to:
select the first connection state, if the opened state is detected by the detection module, and
select the second connection state, if the closed state is detected by the detection module, wherein the first connection state comprises one of the group consisting of:
a first conductive unit electrically coupled to a ground unit and a second conductive unit electrically coupled to the feeding unit, and
the second conductive unit electrically coupled to the ground unit and the first conductive unit electrically coupled to the feeding unit.

2. The mobile electronic device according to claim 1, wherein:
the first conductive unit is located in the first case;
the second conductive unit is located in the second case; and
the balanced feed antenna is located in one of the first case and the second case.

3. The mobile electronic device according to claim 1, wherein the ground unit is coupled to one of the group consisting of: the first case and the second case.

4. The mobile electronic device according to claim 1, further comprising a signal processing module coupled to the ground unit and the feeding unit.

5. The mobile electronic device according to claim 1, wherein the feeding unit is coupled to one of the group consisting of the first case and the second case.

6. The mobile electronic device according to claim 5, wherein the balanced feed antenna is arranged at an end portion of one of the first conductive unit and the second conductive unit, the end portion being arranged on one of the first case and the second case on an opposite side to a side where the first case and the second case are coupled.

7. A mobile electronic device comprising:
a first case coupled to a second case, wherein the first case and the second case are operable to provide one of a closed state and an opened state;
a detection module operable to detect the opened state and the closed state;
a selection switch operable to provide one of a first connection state and a second connection state, the second connection state comprising a balanced feed antenna electrically coupled to a feeding unit; and
a control module operable to:
select the first connection state, if the opened state is detected by the detection module, and
select the second connection state, if the closed state is detected by the detection module, wherein the control module is operable to select one of the first connection state and the second connection state based on a received signal strength in the first connection state and a received signal strength in the second connection state, if the opened state is detected by the detection module.

8. A mobile electronic device comprising:
a pair of cases operable to be in one of an opened state and a closed state;
a first antenna;
a second antenna; and
a control module operable to conduct communication by using the first antenna when the cases are in the closed state, and by using the first antenna and the second antenna when the cases are in the opened state, wherein the control module is operable to combine received signals at the first antenna and the second antenna and to adjust a combined signal when the cases are in the opened state.

9. The mobile electronic device according to claim 8, wherein the first antenna is an unbalanced feed antenna.

10. The mobile electronic device according to claim 8, wherein the second antenna is a balanced feed antenna.

11. The mobile electronic device according to claim 10, wherein the second antenna is a loop antenna, or a folded dipole antenna.

12. The mobile electronic device according to claim 8, wherein the control module uses:
the first antenna, if a received signal strength of the first antenna is higher than a received signal strength of the second antenna; and
the second antenna, if the received signal strength of the second antenna is higher than the received signal strength of the first antenna.

13. The mobile electronic device according to claim 8, wherein the first antenna is an unbalanced feed antenna, and the second antenna is a balanced feed antenna.

14. A method of operating a mobile electronic device, the method comprising:
providing a pair of cases operable to be in one of an opened state and a closed state;
providing first antenna means;
providing second antenna means;
communicating by using the first antenna means when the cases are in the closed state, and by using the first antenna means and the second antenna means when the cases are in the opened state;
detecting the opened state and the closed state;
selecting a first connection state, if the opened state is detected; and
selecting a second connection state, if the closed state is detected, wherein the first connection state comprises one of the group consisting of:
a first conductive unit electrically coupled to a ground unit and a second conductive unit electrically coupled to a feeding unit, and
the second conductive unit electrically coupled to the ground unit and the first conductive unit being electrically coupled to the feeding unit.

15. The method of operating a mobile electronic device according to claim 14, wherein the second connection state comprises a balanced feed antenna electrically coupled to a feeding unit.

* * * * *